US012560762B2

(12) United States Patent
Bian et al.

(10) Patent No.: US 12,560,762 B2
(45) Date of Patent: Feb. 24, 2026

(54) REFLECTORS FOR A PHOTONICS CHIP

(71) Applicant: GlobalFoundries U.S. Inc., Malta, NY (US)

(72) Inventors: Yusheng Bian, Ballston Lake, NY (US); Ryan Sporer, Mechanicville, NY (US); Karen Nummy, Newburgh, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 402 days.

(21) Appl. No.: 18/203,321

(22) Filed: May 30, 2023

(65) Prior Publication Data

US 2024/0402426 A1    Dec. 5, 2024

(51) Int. Cl.
G02B 6/124 (2006.01)
G02B 6/12 (2006.01)
G02B 6/13 (2006.01)

(52) U.S. Cl.
CPC .............. G02B 6/124 (2013.01); G02B 6/13 (2013.01); *G02B 2006/12104* (2013.01); *G02B 2006/12107* (2013.01)

(58) Field of Classification Search
CPC ................................. G02B 6/124; G02B 6/13
See application file for complete search history.

(56) References Cited

U.S. PATENT DOCUMENTS

| | | | |
|---|---|---|---|
| 10,921,526 B2 | 2/2021 | Bian et al. | |
| 11,187,852 B1 * | 11/2021 | Bian | G02B 6/136 |
| 11,243,350 B2 | 2/2022 | Bian et al. | |
| 11,668,967 B2 * | 6/2023 | Yoshida | G06F 3/0445 |
| | | | 349/12 |
| 2015/0063753 A1 * | 3/2015 | Evans | H01S 5/12 |
| | | | 438/31 |
| 2020/0278485 A1 * | 9/2020 | Iwata | C23C 4/134 |
| 2021/0247568 A1 * | 8/2021 | Shi | H05K 1/0274 |
| 2021/0286130 A1 * | 9/2021 | Bian | G02B 6/124 |
| 2022/0057576 A1 | 2/2022 | Bian et al. | |
| 2024/0345300 A1 * | 10/2024 | Hannigan | G02B 1/16 |

OTHER PUBLICATIONS

Cheng, Lirong, Simei Mao, Zhi Li, Yaqi Han, and H. Y. Fu. 2020. "Grating Couplers on Silicon Photonics: Design Principles, Emerging Trends and Practical Issues" Micromachines 11, No. 7: 666. https://doi.org/10.3390/mi11070666.

Sae-Lao B, Bajt S, Montcalm C, Seely JF. Performance of normal-incidence molybdenum-yttrium multilayer-coated diffraction grating at a wavelength of 9 nm. Appl Opt. May 1, 2002;41(13):2394-400. doi: 10.1364/ao.41.002394. PMID: 12009147.

(Continued)

*Primary Examiner* — Tina Wong

(74) *Attorney, Agent, or Firm* — Thompson Hine LLP; Anthony Canale

(57) ABSTRACT

Structures for a photonics chip that include a reflector and methods of forming such structures. The structure comprises a reflector including a dielectric layer on a semiconductor substrate, a plurality of trenches in the dielectric layer, and a reflector layer. Each trench includes a plurality of sidewalls, and the reflector layer includes a portion on the sidewalls of each trench. The structure further comprises a photonic component over the reflector.

20 Claims, 5 Drawing Sheets

(56) References Cited

OTHER PUBLICATIONS

W. S. Zaoui, A. Kunze, W. Vogel and M. Berroth, "CMOS-Compatible Polarization Splitting Grating Couplers With a Backside Metal Mirror," in IEEE Photonics Technology Letters, vol. 25, No. 14, pp. 1395-1397, Jul. 15, 2013, doi: 10.1109/LPT.2013. 2266132.

Nambiar, S., Ranganath, P., Kallega, R. et al. "High efficiency DBR assisted grating chirp generators for silicon nitride fiber-chip coupling." Sci Rep 9, 18821 (2019). https://doi.org/10.1038/s41598-019-55140-8.

M. K. Emsley, O. Dosunmu and M. S. Unlu, "Silicon substrates with buried distributed Bragg reflectors for resonant cavity-enhanced optoelectronics," in IEEE Journal of Selected Topics in Quantum Electronics, vol. 8, No. 4, pp. 948-955, Jul.-Aug. 2002, doi: 10.1109/ JSTQE.2002.801692.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.

Y. Bian et al., "3D Integrated Laser Attach Technology on 300-mm Monolithic Silicon Photonics Platform," 2020 IEEE Photonics Conference (IPC), Vancouver, BC, Canada, 2020, pp. 1-2, doi: 10.1109/IPC47351.2020.9252280.

B. Peng et al., "A CMOS Compatible Monolithic Fiber Attach Solution with Reliable Performance and Self-alignment," In Optical Fiber Communication Conference (OFC) 2020, OSA Technical Digest (Optica Publishing Group, 2020), paper Th3I.4.

A. Aboketaf et al., "Towards fully automated testing and characterization for photonic compact modeling on 300-mm wafer platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper W6A.1.

Y. Bian et al., "Light manipulation in a monolithic silicon photonics platform leveraging 3D coupling and decoupling," in Frontiers in Optics / Laser Science, B. Lee, C. Mazzali, K. Corwin, and R. Jason Jones, eds., OSA Technical Digest (Optica Publishing Group, 2020), paper FTu6E.3.

Y. Bian et al., "3D silicon photonic interconnects and integrated circuits based on phase matching," 2021 IEEE 71st Electronic Components and Technology Conference (ECTC), 2021, pp. 2279-2284, doi: 10.1109/ECTC32696.2021.00357.

A. Chowdhury et al., "High Performance Avalanche Photodiode in a Monolithic Silicon Photonics Technology," 2022 Optical Fiber Communications Conference and Exhibition (OFC), San Diego, CA, USA, 2022, pp. 1-3.

Y. Bian et al., "3D Integrated Laser Attach Technology on a 300-mm Monolithic CMOS Silicon Photonics Platform," in IEEE Journal of Selected Topics in Quantum Electronics, vol. 29, No. 3: Photon. Elec. Co-Inte. and Adv. Trans. Print., pp. 1-19, May-Jun. 2023, Art No. 8200519, doi: 10.1109/JSTQE.2023.3238290.

* cited by examiner

REFLECTORS FOR A PHOTONICS CHIP

BACKGROUND

The disclosure relates to photonics chips and, more specifically, to structures for a photonics chip that include a reflector and methods of forming such structures.

Photonics chips are used in many applications and systems including, but not limited to, data communication systems and data computation systems. A photonics chip includes a photonic integrated circuit comprised of photonic components, such as modulators, polarizers, and optical couplers, that are used to manipulate light received from a light source, such as an optical fiber or a laser.

A reflector may be incorporated as a photonic component into the photonic integrated circuit of a photonics chip. A distributed Bragg reflector is a common type of reflector that is used to enhance the coupling efficiency of a photonic component. However, the process flow needed to form the vertical stack of multiple layers need for a distributed Bragg reflector is complex.

Improved structures for a photonics chip that include a reflector and methods of forming such structures are needed.

SUMMARY

In an embodiment of the invention, a structure for a photonics chip is provided. The structure comprises a reflector including a dielectric layer on a semiconductor substrate, a plurality of trenches in the dielectric layer, and a reflector layer. Each trench includes a plurality of sidewalls, and the reflector layer includes a portion on the sidewalls of each trench. The structure further comprises a photonic component over the reflector.

In an embodiment of the invention, a method of forming a photonics chip is provided. The method comprises forming a reflector including a dielectric layer on a semiconductor substrate, a plurality of trenches in the dielectric layer, and a reflector layer. Each trench includes a plurality of sidewalls, and the reflector layer includes a portion on the sidewalls of each trench. The method further comprises forming a photonic component over the reflector.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

FIG. 2A is a top view of the structure in which FIG. 2 is taken generally along line 2-2.

DETAILED DESCRIPTION

Figure 1:
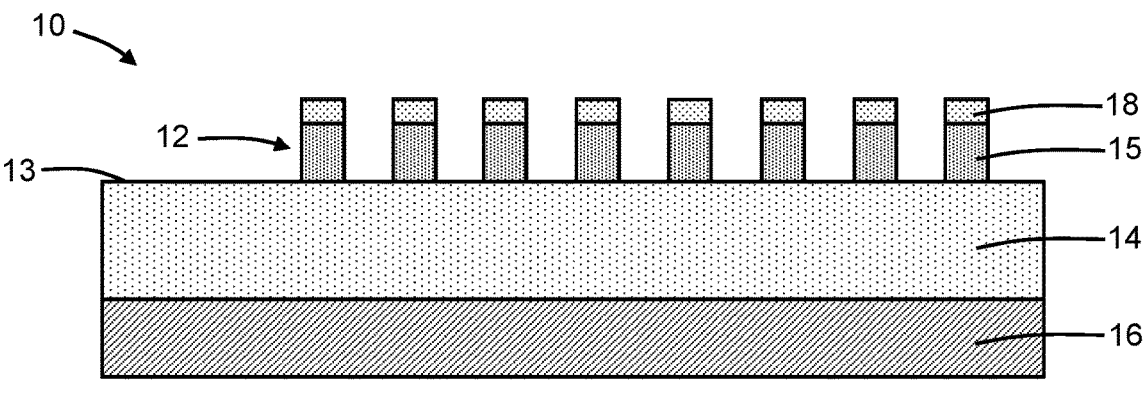
FIG. 1 is a cross-sectional view of a structure at an initial fabrication stage of a processing method in accordance with embodiments of the invention.

With reference to FIG. 1 and in accordance with embodiments of the invention, a structure 10 for a photonics chip includes a sectioned layer 12 having multiple sections 15 that are positioned on, and over, a dielectric layer 14 and a semiconductor substrate 16. In an embodiment, the dielectric layer 14 may be comprised of a dielectric material, such as silicon dioxide, and the semiconductor substrate 16 may be comprised of a semiconductor material, such as single-crystal silicon. In an embodiment, the dielectric layer 14 may be a buried oxide layer of a silicon-on-insulator substrate. The sectioned layer 12 is separated from the semiconductor substrate 16 by the dielectric material of the intervening dielectric layer 14. The dielectric layer 14 adjoins the semiconductor substrate 16 along an interface, and the dielectric layer 14 has a top surface 13 on which the sectioned layer 12 is positioned.

In an embodiment, the sectioned layer 12 may be comprised of a semiconductor material, such as single-crystal silicon. In an embodiment, the sections 15 of the sectioned layer 12 may be formed by patterning a semiconductor material layer with lithography and etching processes. In an embodiment, a hardmask 18 may be formed by a lithography process over the layer, and unmasked sections of the semiconductor material layer may be etched and removed with an etching process. In an embodiment, the sectioned layer 12 may be formed by patterning the semiconductor material (e.g., single-crystal silicon) of the device layer of a silicon-on-insulator substrate. The hardmask 18 may be removed after forming the sectioned layer 12.

Figure 2:
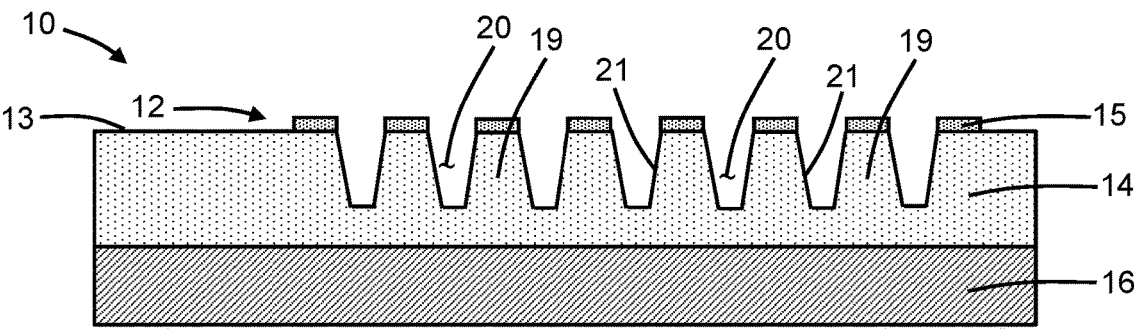
FIG. 2 is a cross-sectional view of the structure at a fabrication stage of the processing method subsequent to FIG. 1.
Figure 2A:
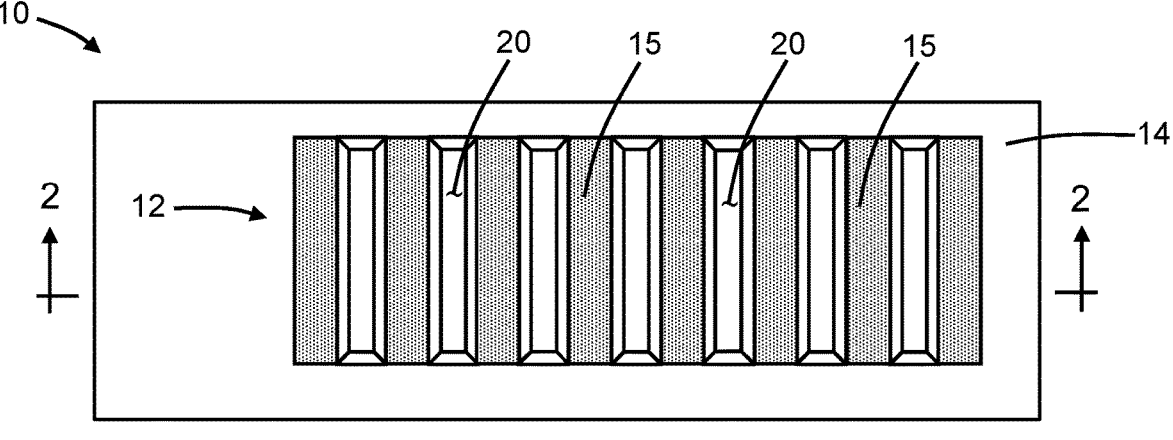

With reference to FIGS. 2, 2A in which like reference numerals refer to like features in FIG. 1 and at a subsequent fabrication stage, trenches 20 may be formed in a region of the dielectric layer 14. The sections 15 of the sectioned layer 12 may supply a hardmask during an etching process used to pattern the trenches 20. The thickness of the sections 15 of the sectioned layer 12 may be reduced by the etching process forming the trenches 20.

The trenches 20 may include sidewalls 21 that extend from the top surface 13 partially through the thickness of the dielectric layer 14 such that a portion of the dielectric layer 14 is disposed between the bottom of each trench 20 and the semiconductor substrate 16. In an embodiment, the trenches 20 may have in a parallel arrangement in an array with a ridge 19 of the dielectric material of the dielectric layer 14 defined between the sidewalls 21 of adjacent trenches 20. A section 15 of the sectioned layer 12 is disposed on each ridge 19 at the top surface 13 between each pair of adjacent trenches 20. The ridges 19 terminate at the top surface 13 of the dielectric layer 14 beneath the sections 15 of the sectioned layer 12.

Figure 3:
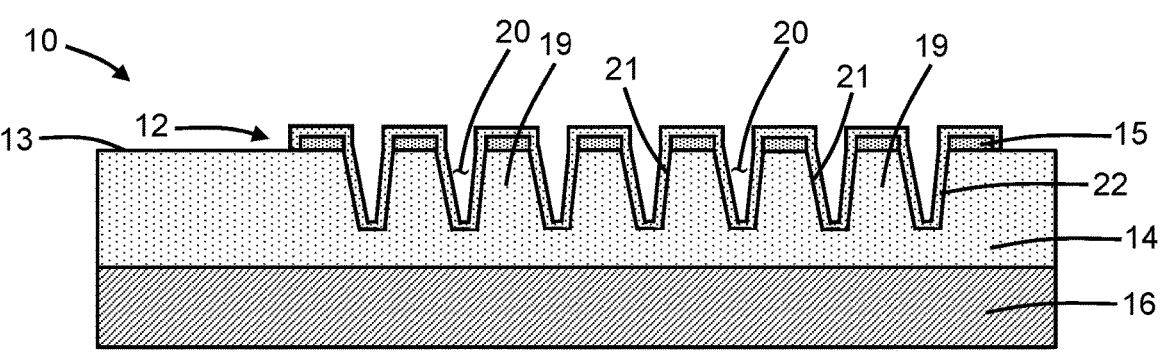
FIG. 3 is a cross-sectional view of the structure at a fabrication stage of the processing method subsequent to FIG. 2.

With reference to FIG. 3 in which like reference numerals refer to like features in FIGS. 2, 2A and at a subsequent fabrication stage, a reflector layer 22 may be formed over the region of the dielectric layer 14 that includes the sections 15 of the sectioned layer 12 and the trenches 20. The reflector layer 22 may be a conformal layer that follows the contour of the corrugations defined by the trenches 20 and that is disposed with a uniform or substantially uniform thickness on the sidewalls 21 of the trenches 20 and on the sections 15 of the sectioned layer 12. The reflector layer 22 may be deposited and patterned by lithography and etching processes such that the reflector layer 22 is removed outside of the region of the dielectric layer 14 that includes the sectioned layer 12 and the trenches 20. The reflector layer 22 overlaps with the sections 15 of the sectioned layer 12, and the reflector layer 22 also overlaps with the ridges 19 on which the sections 15 of the sectioned layer 12 are positioned.

In an embodiment, the reflector layer 22 may be comprised of a material having a higher refractive index than the material of the dielectric layer 14. In an embodiment, the reflector layer 22 may be comprised of a semiconductor material, such as polysilicon or amorphous silicon. In an embodiment, the reflector layer 22 may be comprised of a metal, such as gold or copper. In an embodiment, the reflector layer 22 may include multiple sublayers comprised of different materials.

The portions of the reflector layer 22 inside the trenches 20 and the portions of the reflector layer 22 over the sections 15 of the sectioned layer 12 may define a reflector having a sawtooth or corrugated shape. A portion of the reflector layer 22 is disposed inside each trench 20 and, more specifically, a portion of the reflector layer 22 is disposed on the sidewalls 21 of each trench 20. The portion of the reflector layer 22 inside each trench 20 may be positioned fully below the top surface 13 of the dielectric layer 14. In addition, the sections 15 of the sectioned layer 12, which may be positioned fully over the top surface 13 of the dielectric layer 14, may also define a reflector that is separate and distinct from the reflector including the portions of the reflector layer 22 inside the trenches 20.

Figure 4:
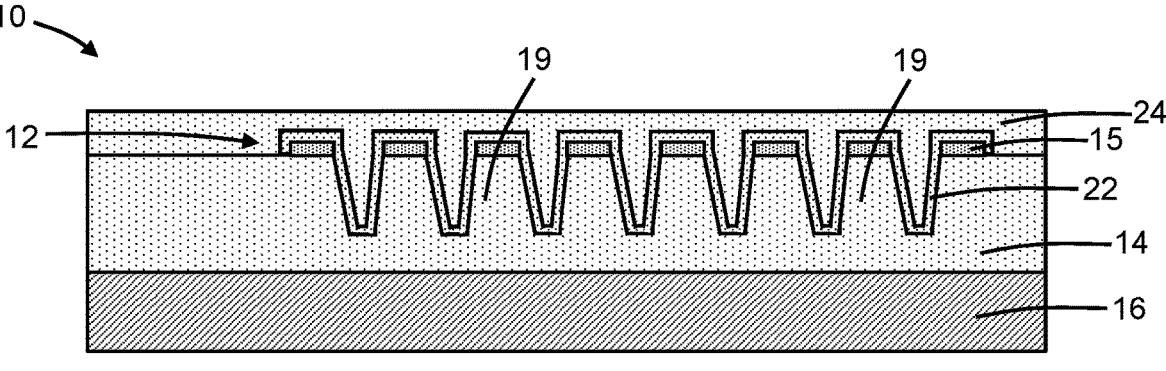
FIG. 4 is a cross-sectional view of the structure at a fabrication stage of the processing method subsequent to FIG. 3.

With reference to FIG. 4 in which like reference numerals refer to like features in FIG. 3 and at a subsequent fabrication stage, a dielectric layer 24 may be formed over the reflector layer 22 and the surrounding portions of the dielectric layer 14. The dielectric layer 24 may be comprised of a dielectric material, such as silicon dioxide, that is deposited and planarized by chemical-mechanical polishing. The dielectric material of the dielectric layer 24 includes portions that are disposed inside the trenches 20. The portion of the reflector layer 22 on the sidewalls 21 of each trench 20 is positioned between the portion of the dielectric layer 24 inside each trench 20 and the dielectric layer 14. In an embodiment, the dielectric layer 24 may have a thickness sufficient to bury the sectioned layer 12.

The trenches 20 may be dimensioned and positioned at small enough pitch so as to define a sub-wavelength grating that does not radiate or reflect light at a wavelength of operation. The portions of the dielectric material of the dielectric layer 24 inside the trenches 20 and the portions of the reflector layer 22 inside the trenches 20 may define a metamaterial structure in which the material constituting the reflector layer 22 has a higher refractive index than the dielectric material of the dielectric layer 24. The metamaterial structure can be treated as a homogeneous material having an effective refractive index that is intermediate between the refractive index of the material constituting the reflector layer 22 and the refractive index of the dielectric material constituting the dielectric layer 24.

Figure 5:
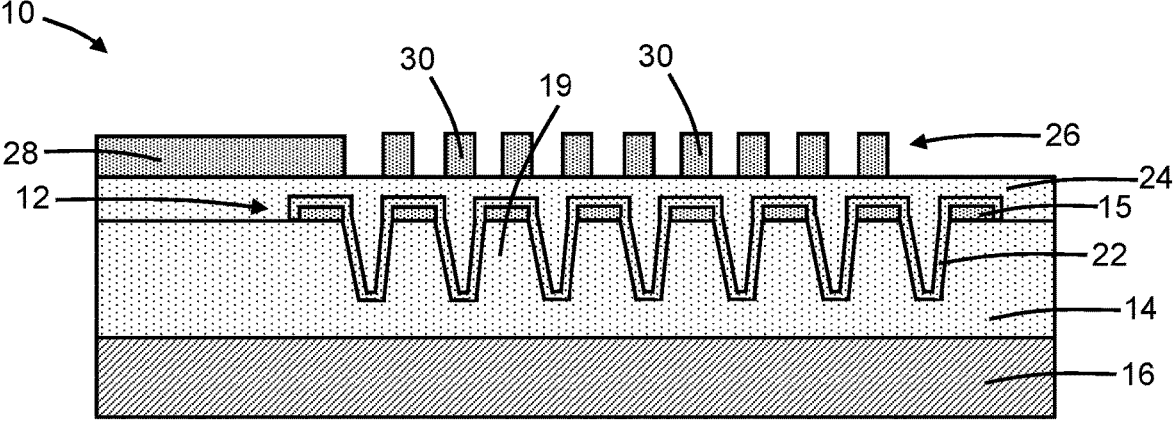
FIG. 5 is a cross-sectional view of the structure at a fabrication stage of the processing method subsequent to FIG. 4.

With reference to FIG. 5 in which like reference numerals refer to like features in FIG. 4 and at a subsequent fabrication stage, a grating coupler 26 and a waveguide core 28 may be formed as photonic components on, and over, the dielectric layer 24. The grating coupler 26 may be arranged at least in part over the reflector defined by the reflector layer 22 inside the trenches 20 and the reflector defined by the sectioned layer 12. In an embodiment, the grating coupler 26 may be fully arranged over the reflector defined by the reflector layer 22 inside the trenches 20 and the reflector defined by the sections 15 of the sectioned layer 12. A portion of the dielectric layer 24 is positioned as a thickness of dielectric material between the reflectors and the grating coupler 26.

The grating coupler 26 may include multiple grating lines 30 that are separated by gaps. In an embodiment, the pitch and duty cycle of the grating lines 30 may be uniform to define a periodic arrangement. In alternative embodiments, the pitch and/or the duty cycle of the grating lines 30 may be apodized (i.e., non-uniform) to define an aperiodic arrangement. The grating lines 30 may be dimensioned and positioned at small enough pitch so as to define a sub-wavelength grating that does not radiate or reflect light at a wavelength of operation. The grating lines 30 may be linear or curved, and the grating lines 30 may increase in width with increasing distance from the waveguide core 28.

In an embodiment, the grating coupler 26 and waveguide core 28 may be comprised of a material having a refractive index that is greater than the refractive index of silicon dioxide. In an embodiment, the grating coupler 26 and waveguide core 28 may be comprised of a dielectric material, such as silicon nitride, silicon oxynitride, or aluminum nitride. In an alternative embodiment, the grating coupler 26 and waveguide core 28 may be comprised of a semiconductor material, such as amorphous silicon or polysilicon. In alternative embodiments, other materials, such as a III-V compound semiconductor, may be used to form the grating coupler 26 and waveguide core 28.

In an embodiment, the grating coupler 26 and waveguide core 28 may be formed by patterning a deposited layer comprised of the constituent material (e.g., silicon nitride) with lithography and etching processes. In an embodiment, an etch mask may be formed by a lithography process over the deposited layer, and unmasked sections of the deposited layer may be etched and removed with an etching process to define the grating lines 30 of the grating coupler 26 and the waveguide core 28.

Figure 6:
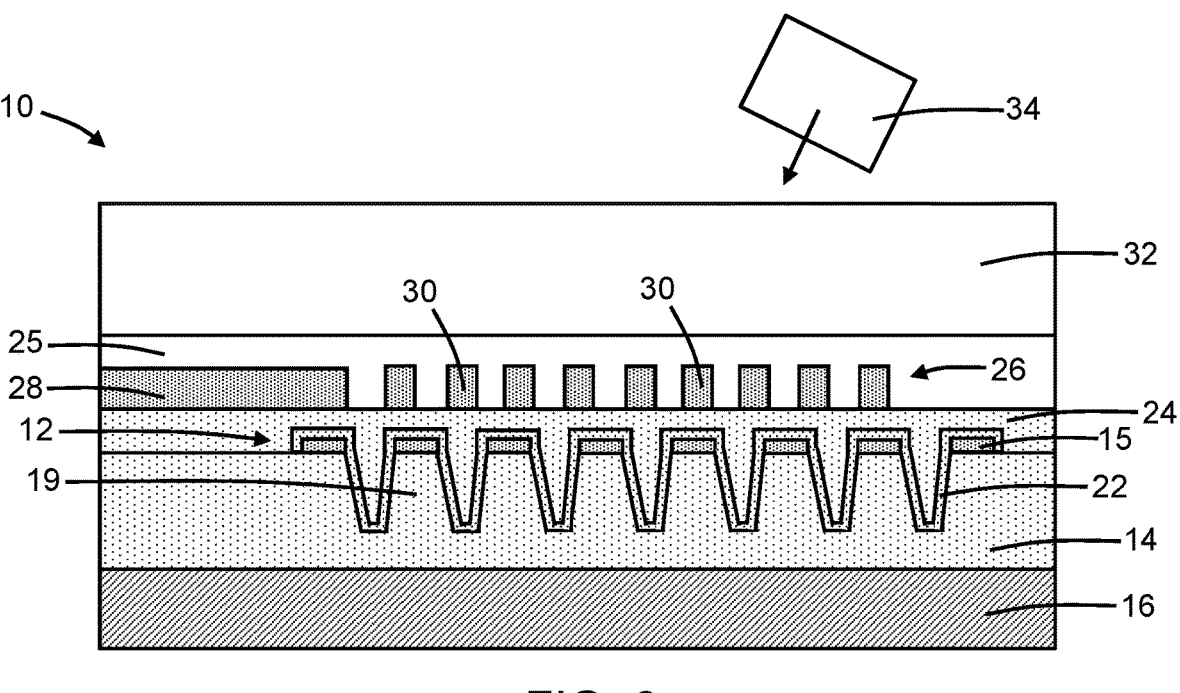
FIG. 6 is a cross-sectional view of the structure at a fabrication stage of the processing method subsequent to FIG. 5.

With reference to FIG. 6 in which like reference numerals refer to like features in FIG. 5 and at a subsequent fabrication stage, a dielectric layer 25 may be formed on the dielectric layer 24 over the grating coupler 26 and waveguide core 28. The dielectric layer 25 may be comprised of a dielectric material, such as silicon dioxide, that is deposited and planarized by chemical-mechanical polishing. The dielectric material of the dielectric layer 25 may be disposed in the gaps between the grating lines 30 of the grating coupler 26.

A back-end-of-line stack 32 may be formed over the structure 10. The back-end-of-line stack 32 may include stacked interlayer dielectric layers in which each interlayer dielectric layer is comprised of a dielectric material, such as silicon dioxide, silicon nitride, tetraethylorthosilicate silicon dioxide, or fluorinated-tetraethylorthosilicate silicon dioxide.

The reflector including the reflector layer 22 inside the trenches 20 and the reflector including the sections 15 of the sectioned layer 12 on the ridges 19 may enhance the performance of the grating coupler 26. Performance enhancements may include, but are not limited to, an improvement in the coupling efficiency of the grating coupler 26. For example, the grating coupler 26 may receive incident light from an optical fiber 34, a portion may be captured by the grating coupler 26 and routed from the grating coupler 26 to the waveguide core 28, and a portion of the light is not captured by the grating coupler 26. The portion of the light that is not captured by the grating coupler 26 is reflected by the reflectors back toward the grating coupler 26 for capture by the grating coupler 26 and routing from the grating coupler 26 to the waveguide core 28.

In an alternative embodiment, the reflectors of the structure 10 may be integrated with an antenna for Light Detection and Ranging (LiDAR) applications, such as control and navigation applications for autonomous vehicles.

Figure 7:
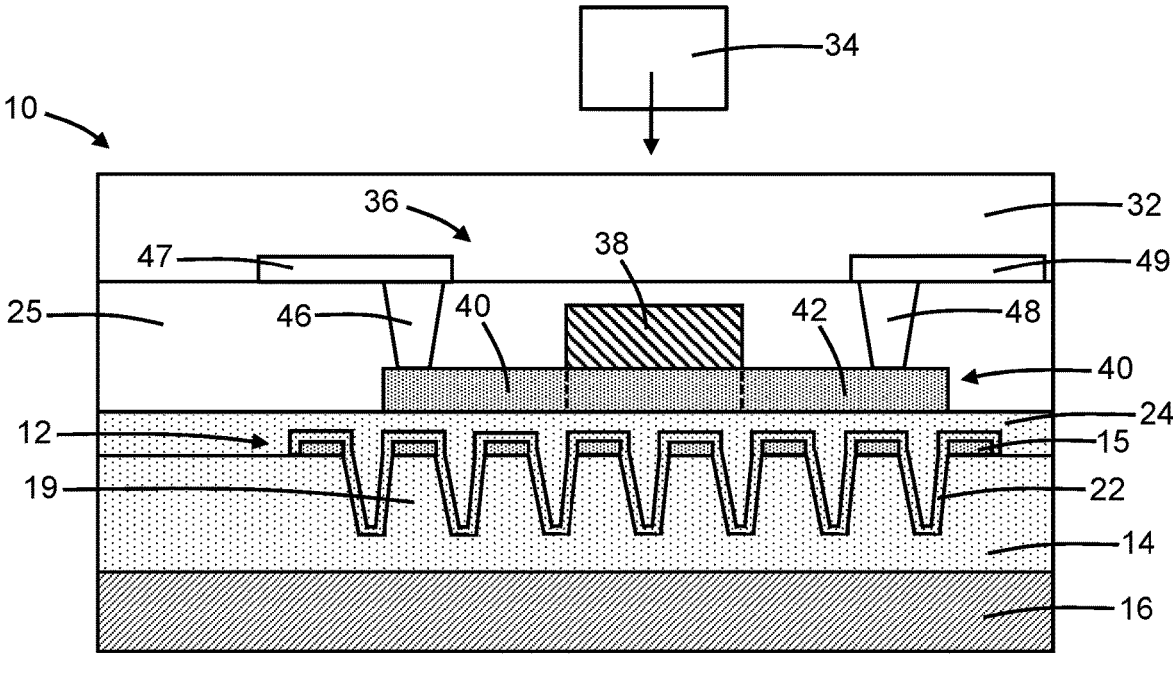
FIG. 7 is a cross-sectional view of a structure in accordance with embodiments of the invention.

With reference to FIG. 7 and in accordance with alternative embodiments, that structure 10 may include a photodetector 36 that is disposed as a photonic component over the reflector including the reflector layer 22 inside the trenches 20 and the reflector including the sections 15 of the sectioned layer 12 on the ridges 19. The photodetector 36 includes a light-absorbing layer 38 that may be comprised of a semiconductor material that generates charge carriers from absorbed light by the photoelectric effect. In an embodiment, the light-absorbing layer 38 may be comprised of germanium. In an embodiment, the light-absorbing layer 38 may be comprised of intrinsic germanium. In an alternative embodiment, the light-absorbing layer 38 may be comprised of silicon-germanium. In an alternative embodiment, the light-absorbing layer 38 may be comprised of silicon. In an embodiment, the material of the light-absorbing layer 38 may be configured to absorb infrared light. In an alternative embodiment, the material of the light-absorbing layer 38 may be configured to absorb visible light.

The photodetector 36 may further include a pad 40 from which the semiconductor material of the light-absorbing layer 38 may be epitaxially grown. In an embodiment, the pad 40 may be comprised of a semiconductor material, such as single-crystal silicon. The pad 40 may include doped regions 42, 44 that are doped to have opposite conductivity types and that define an anode and a cathode of the photodetector 36. The doped regions 42, 44 may be contacted by contacts 46, 48 that couple the doped regions 42, 44 to respective interconnects 47, 49. The structure 10 may be formed by fabricating the reflectors, fabricating the photodetector 36 on a separate substrate, and performing a wafer bonding process to attach the substrate including the photodetector 36 to the substrate including the reflectors.

In use, light (e.g., infrared laser light) may be supplied from the optical fiber 34 to the photodetector 36. The light-absorbing layer 38 absorbs photons of the light and converts the absorbed photons into charge carriers. Biasing of the doped regions 42, 44 causes the charge carriers to be collected and output to provide, as a function of time, a measurable photocurrent. The reflectors may improve the absorption and responsivity for the photodetector 36 by reflecting light that is transmitted through the light-absorbing layer 38 and the pad 40 back to the light-absorbing layer 38.

Figure 8:
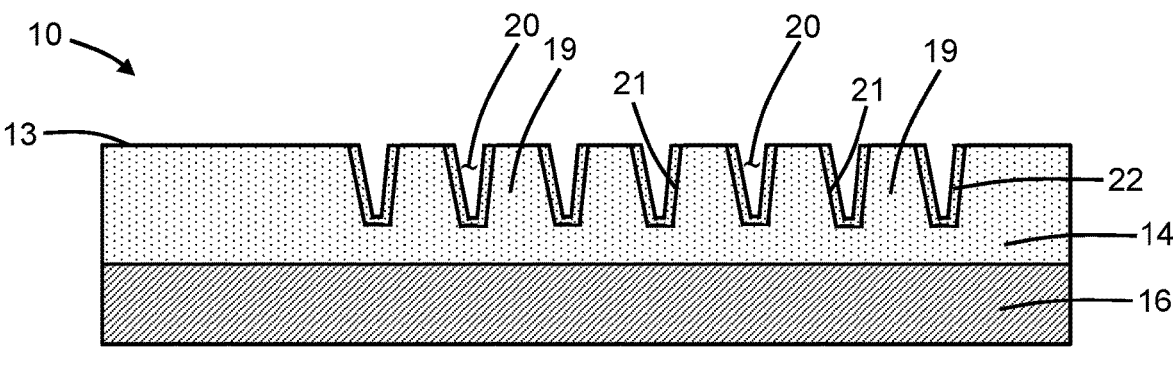
FIG. 8 is a cross-sectional view of a structure at a fabrication stage of a processing method in accordance with alternative embodiments of the invention.

With reference to FIG. 8 in which like reference numerals refer to like features in FIG. 3 and in accordance with alternative embodiments, the structure 10 may be modified by removing the sections 15 of the sectioned layer 12 and the portions of the reflector layer 22 above the top surface 13 of the dielectric layer 14 from the dielectric layer 14 before forming the grating coupler 26 and waveguide core 28. In an embodiment, the sectioned layer 12 and the portions of the reflector layer 22 above the top surface 13 of the dielectric layer 14 may be removed by chemical-mechanical polishing. A reflector is defined by the trenches 20 and the portions of the reflector layer 22 inside the trenches 20. The portions of the reflector layer 22 inside the trenches 20 are disconnected from each other at the top surface 13 of the dielectric layer 14. The reflector including the reflector layer 22 inside the trenches 20 may enhance the performance of the grating coupler 26 by, for example, by improving the coupling efficiency of the grating coupler 26.

Figure 9:
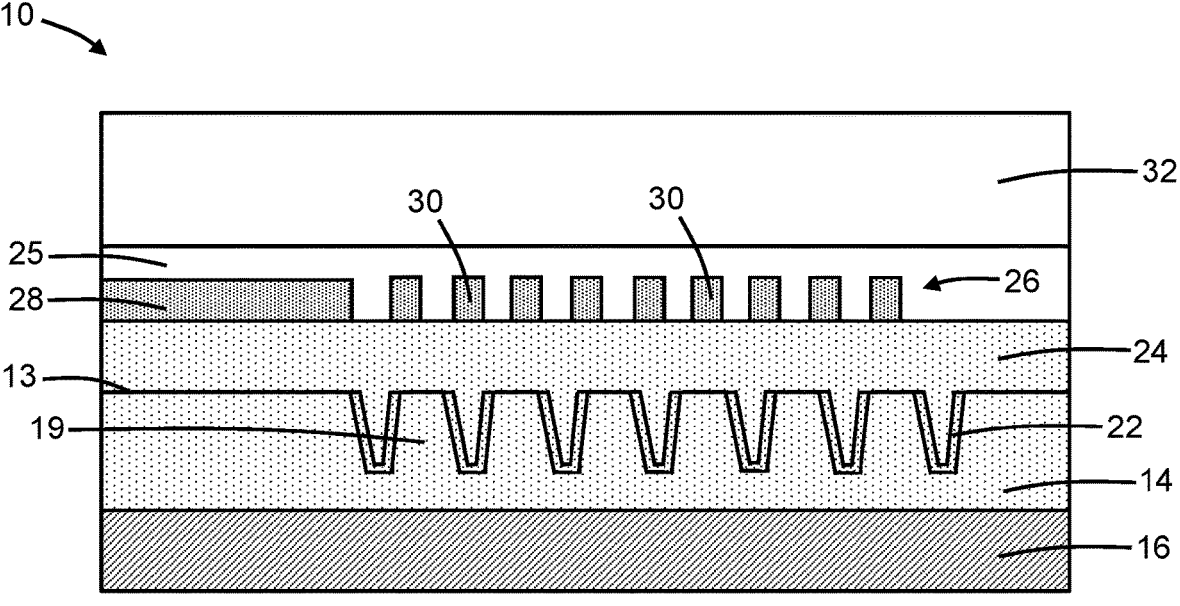
FIG. 9 is a cross-sectional view of the structure at a fabrication stage of the processing method subsequent to FIG. 8.

With reference to FIG. 9 in which like reference numerals refer to like features in FIG. 8 and at a subsequent fabrication stage, the dielectric layer 24 may be formed that includes portions disposed inside the trenches 20, followed by the formation of the grating coupler 26, the waveguide core 28, the dielectric layer 25, and the back-end-of-line stack 32. The portion of the dielectric layer 24 inside each trench 20 may fill the space that is unfilled by the portion of the reflector layer 22 inside the trench 20. In an alternative embodiment, the photodetector 36 (FIG. 7) may be formed over the reflector instead of the grating coupler 26.

Figures 10, 11:
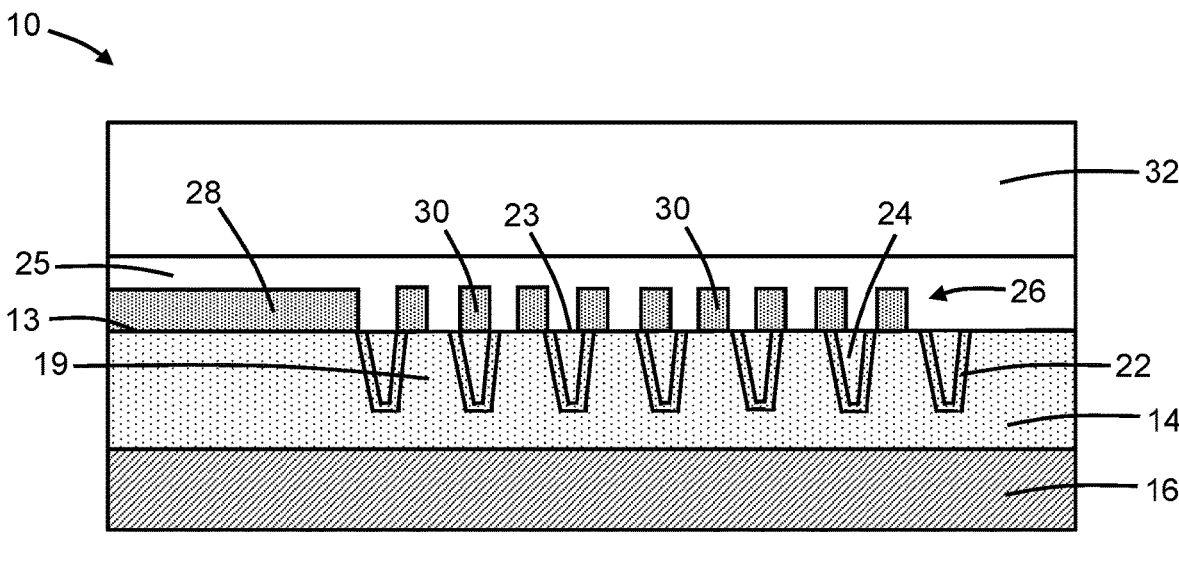
FIG. 10 is a cross-sectional view of a structure in accordance with embodiments of the invention.
FIG. 11 is a cross-sectional view of a structure in accordance with embodiments of the invention.

With reference to FIG. 10 in which like reference numerals refer to like features in FIG. 9 and in accordance with alternative embodiments, the dielectric layer 24 may be planarized following deposition. As a result, the dielectric layer 24 includes portions disposed below the top surface 13 of the dielectric layer 14 and inside the trenches 20, and the dielectric layer 24 lacks any portions above the top surface 13. In an embodiment, the portions of the dielectric layer 24 may have a top surface 23 that is coplanar with the top surface 13 of the dielectric layer 14. The grating coupler 26, the waveguide core 28, the dielectric layer 25, and the back-end-of-line stack 32 may be subsequently formed.

With reference to FIG. 11 and in accordance with alternative embodiments, the structure 10 may include a waveguide core 50 and a grating coupler 52 that are disposed as photonic components over the reflector including the reflector layer 22 inside the trenches 20 and the reflector including the sections 15 of the sectioned layer 12 on the ridges 19. The grating coupler 52 may include multiple grating lines 54 that are separated by gaps. In an embodiment, the waveguide core 50 may be comprised of a semiconductor material, such as single-crystal silicon, and the grating coupler 52 may be comprised of a different material, such as polysilicon. In an embodiment, the waveguide core 50 may be formed by patterning a deposited layer of its constituent semiconductor material with lithography and etching processes. In an embodiment, the grating coupler 52 may be formed by patterning a deposited layer of its constituent material with lithography and etching processes. One or more conformal layers 56 of dielectric material may be formed that coat the grating lines 54 of the grating coupler 52. The dielectric layer 25 and the back-end-of-line stack 32 may be subsequently formed.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a photonics chip, the structure comprising:
   a semiconductor substrate;
   a first reflector including a first dielectric layer on the semiconductor substrate, a plurality of trenches in the first dielectric layer, and a reflector layer, each trench including a plurality of sidewalls, and the reflector layer including a first portion on the sidewalls of each trench; and
   a photonic component over the first reflector,
   wherein the first dielectric layer has a top surface, the first dielectric layer includes a plurality of ridges defined by the trenches, and the ridges terminate at the top surface of the first dielectric layer.

2. The structure of claim 1 wherein the reflector layer comprises a material having a higher index of refraction than the first dielectric layer.

3. The structure of claim 1 wherein the trenches extend from the top surface into the first dielectric layer.

4. The structure of claim 3 further comprising:
   a second reflector including a plurality of sections, each of the sections on the top surface of the first dielectric layer between an adjacent pair of the trenches.

5. The structure of claim 4 wherein the trenches have a parallel arrangement in an array, and the sections of the second reflector are positioned at the top surface on the ridges.

6. The structure of claim 4 wherein the reflector layer includes a second portion that overlaps with each section of the second reflector.

7. The structure of claim 1 wherein the trenches extend partially through the first dielectric layer.

8. The structure of claim 1 wherein the reflector layer conformally coats the sidewalls of each trench.

9. The structure of claim 1 wherein the first portions of the reflector layer are disconnected.

10. The structure of claim 1 wherein the photonic component is a photodetector.

11. The structure of claim 1 wherein the photonic component is a grating coupler.

12. The structure of claim 11 wherein the grating coupler is positioned on the top surface of the first dielectric layer, and further comprising:
   a waveguide core on the top surface of the first dielectric layer,
   wherein the waveguide core is positioned adjacent to the grating coupler.

13. The structure of claim 11 further comprising:
   a waveguide core positioned between the grating coupler and the first reflector.

14. The structure of claim 1 wherein the trenches have a parallel arrangement in an array.

15. The structure of claim 1 further comprising:
   a second dielectric layer on the first dielectric layer, the second dielectric layer including a first portion inside each trench, and the second dielectric layer including a second portion between the first reflector and the photonic component.

16. The structure of claim 1 further comprising:
   a second dielectric layer including a portion inside each trench,
   wherein the reflector layer on the sidewalls of each trench is positioned between the portion of the second dielectric layer and the first dielectric layer.

17. A structure for a photonics chip, the structure comprising:
   a semiconductor substrate;
   a reflector including a first dielectric layer on the semiconductor substrate, a plurality of trenches in the first dielectric layer, and a reflector layer, each trench including a plurality of sidewalls, and the reflector layer including a portion on the sidewalls of each trench;
   a photonic component over the reflector; and
   a second dielectric layer on the first dielectric layer, the second dielectric layer including a first portion inside each trench, and the second dielectric layer including a second portion between the reflector and the photonic component.

18. A structure for a photonics chip, the structure comprising:

a semiconductor substrate;

a reflector including a first dielectric layer on the semiconductor substrate, a plurality of trenches in the first dielectric layer, and a reflector layer, each trench including a plurality of sidewalls, and the reflector layer including a portion on the sidewalls of each trench;

a photonic component over the reflector; and a second dielectric layer including a portion inside each trench, wherein the portion of the reflector layer on the sidewalls of each trench is positioned between the portion of the second dielectric layer and the first dielectric layer.

19. The structure of claim 18 wherein each portion of the second dielectric layer has a top surface that is coplanar with the top surface of the first dielectric layer.

20. The structure of claim 18 wherein the portions of the second dielectric layer and the portions of the reflector layer define a metamaterial structure.

* * * * *